(12) United States Patent
Kwon

(10) Patent No.: US 11,476,960 B2
(45) Date of Patent: Oct. 18, 2022

(54) REPEATER AND METHOD FOR MEASURING SIGNAL-TO-INTERFERENCE-PLUS-NOISE RATIO THEREOF

(71) Applicant: SOLiD, INC., Seongnam-si (KR)

(72) Inventor: Nag Won Kwon, Yongin-si (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 17/319,357

(22) Filed: May 13, 2021

(65) Prior Publication Data

US 2021/0359776 A1    Nov. 18, 2021

(30) Foreign Application Priority Data

May 13, 2020   (KR) .................. 10-2020-0056894
May 11, 2021   (KR) .................. 10-2021-0060658

(51) Int. Cl.
*H04B 17/40*    (2015.01)
*H04B 7/155*    (2006.01)
*H04W 56/00*    (2009.01)
*H04B 17/336*   (2015.01)

(52) U.S. Cl.
CPC ............. *H04B 17/40* (2015.01); *H04B 7/155* (2013.01); *H04B 17/336* (2015.01); *H04W 56/001* (2013.01)

(58) Field of Classification Search
CPC ...... H04B 17/40; H04B 7/155; H04B 17/336; H04W 56/001
See application file for complete search history.

(56) References Cited

FOREIGN PATENT DOCUMENTS

| KR | 10-1435719 B1 | 9/2014 | |
|---|---|---|---|
| KR | 10-2016-0088138 A | 7/2016 | |
| WO | WO-2019110869 A1 * | 6/2019 | ............. H04B 7/155 |

* cited by examiner

*Primary Examiner* — Keith Ferguson
(74) *Attorney, Agent, or Firm* — Sughrue Mion, PLLC

(57) ABSTRACT

Provided is an SINR measurement method of a repeater, the SINR measurement method including: obtaining SSBs from a plurality of base stations; obtaining cross-correlation for each of PSS symbols included in the obtained SSBs; measuring noise power based on the obtained SSBs; obtaining signal power and interference signal power based on a dot product of the cross-correlation for each of the PSS symbols; and measuring the SINR based on the signal power, the interference signal power, and the noise power.

16 Claims, 8 Drawing Sheets

REPEATER AND METHOD FOR MEASURING SIGNAL-TO-INTERFERENCE-PLUS-NOISE RATIO THEREOF

CROSS-REFERENCE TO RELATED APPLICATION

This application claims the benefit of Korean Patent Application No. 10-2020-0056894, filed on May 13, 2020, and Korean Patent Application No. 10-2021-0060658, filed on May 11, 2021, in the Korean Intellectual Property Office, the disclosures of which are incorporated herein in its entirety by reference.

BACKGROUND

1. Field

The present disclosure relates to a repeater and a signal-to-interference-plus-noise ratio (SINR) measurement method thereof.

2. Description of the Related Art

In general, in order to expand service coverage of a base station or to improve service quality, a relay system such as a communication repeater, an interference cancellation repeater, distributed antenna systems, and the like are used in a radio-shaded area where intensity of a signal is weak or a signal is difficult to reach.

With the supply of 5G new radio (NR) terminals around 2019, 5G mobile communication began to be commercialized, and multi-cell areas are increasing as 5G base stations increase mainly in urban areas.

Because a 5G RF repeater is implemented to receive a base station signal through a donor antenna, which is a directional antenna, when the 5G RF repeater is arranged in a multi-cell area, interference due to signals from other base stations occurs, thereby deteriorating a signal-to-interference-plus-noise ratio (SINR). As the SINR deteriorates, the high-capacity and high-speed communication services required in 5G mobile communication cannot be smoothly provided.

SUMMARY

Provided are signal-to-interference-plus-noise ratio (SINR) measurement methods for optimizing communication quality of a repeater.

According to an aspect of the disclosure, a signal-to-interference-plus-noise ratio (SINR) measurement method of a repeater comprises obtaining synchronization signal blocks (SSBs) from a plurality of base stations; obtaining cross-correlation for each of primary synchronization signal (PSS) symbols included in the obtained SSBs; measuring noise power based on the obtained SSBs; obtaining signal power and interference signal power based on a dot product of the cross-correlation for each of the PSS symbols; and measuring the SINR based on the signal power, the interference signal power, and the noise power.

According to an exemplary embodiment, the obtaining of the cross-correlation comprises generating each sequence of the PSS IDs, and obtaining cross-correlation for each of the PSS symbols by using the generated sequence and the PSS symbols.

According to an exemplary embodiment, the measuring of noise power comprises measuring power of a null area outside a PSS band of the received SSBs as the noise power.

According to an exemplary embodiment, the respective PSS symbols of the SSBs have different IDs, and the obtaining of the signal power and the interference signal power comprises obtaining the signal power from a dot product of cross-correlation for a first PSS symbol having the largest cross-correlation, and obtaining the interference signal power from a dot product of cross-correlation for the remaining PSS symbols except for the first PSS symbol.

According to an exemplary embodiment, the obtaining of the signal power and the interference signal power further comprises setting a section including samples in a preset range based on a sample in which a maximum value of the first PSS symbol is located, and calculating the dot product of the cross-correlation for each of the PSS symbols based on the set section.

According to an exemplary embodiment, the section is set in a range that does not include a cyclic prefix.

According to an exemplary embodiment, the obtaining of the signal power and the interference signal power further comprises applying a predefined correction coefficient to the dot product of the cross-correlation for each of the PSS blocks.

According to an exemplary embodiment, the method further comprises optimizing a direction of a donor antenna for communication with a base station based on the measured SINR.

According to an aspect of the disclosure, a repeater comprises a donor antenna configured to receive synchronization signal blocks (SSBs) from a plurality of base stations, and a digital signal processor configured to measure noise power based on the received SSBs, obtain cross-correlation for each of PSS symbols included in the received SSBs, obtain signal power and interference signal power based on a dot product of the cross-correlation for each of the PSS symbols, and measure an SINR based on the signal power, the interference signal power, and the noise power.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
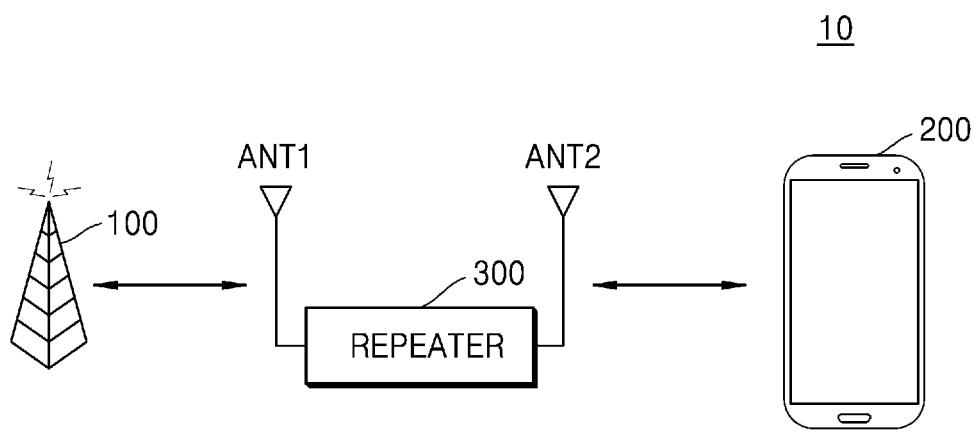
FIG. 1 is a conceptual diagram of a communication system according to an embodiment.

Embodiments according to the inventive concept are provided to more completely explain the inventive concept to one of ordinary skill in the art, and the following embodiments may be modified in various other forms and the scope of the inventive concept is not limited to the following embodiments. Rather, these embodiments are provided so that the present disclosure will be thorough and complete, and will fully convey the scope of the inventive concept to one of ordinary skill in the art.

It will be understood that, although the terms first, second, etc. may be used herein to describe various members, regions, layers, sections, and/or components, these members, regions, layers, sections, and/or components should not be limited by these terms. These terms do not denote any order, quantity, or importance, but rather are only used to distinguish one component, region, layer, and/or section from another component, region, layer, and/or section. Thus, a first member, component, region, layer, or section discussed below could be termed a second member, component, region, layer, or section without departing from the teachings of embodiments. For example, as long as within the scope of this disclosure, a first component may be named as a second component, and a second component may be named as a first component.

Unless otherwise defined, all terms (including technical and scientific terms) used herein have the same meaning as commonly understood by one of ordinary skill in the art to which the inventive concept belongs embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

When a certain embodiment may be implemented differently, a specific process order may be performed differently from the described order. For example, two consecutively described processes may be performed substantially at the same time or performed in an order opposite to the described order.

In the drawings, variations from the illustrated shapes may be expected because of, for example, manufacturing techniques and/or tolerances. Thus, embodiments of the inventive concept should not be construed as being limited to the particular shapes of regions illustrated herein but may include deviations in shapes that result, for example, from manufacturing processes. Like reference numerals in the drawings denote like elements, and thus their overlapped explanations are omitted.

As used herein, the term "and/or" includes any and all combinations of one or more of the associated listed items.

Hereinafter, embodiments of the inventive concept will be described in detail with reference to the accompanying drawings.

Figure 2:
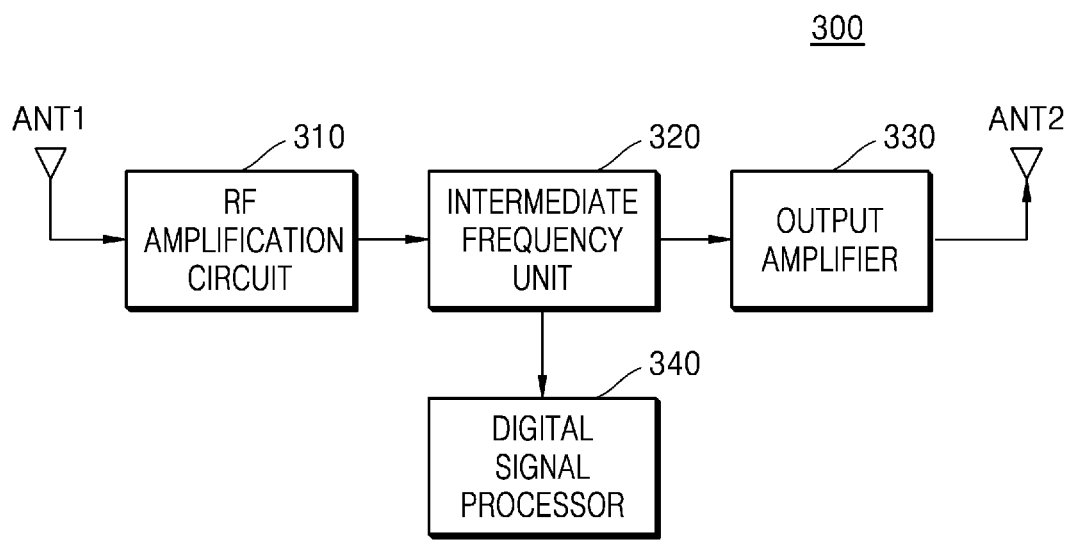
FIG. 2 is a block diagram of a repeater shown in FIG. 1, according to an embodiment.

FIG. 1 is a conceptual diagram of a communication system according to an embodiment. FIG. 2 is a block diagram of a repeater shown in FIG. 1, according to an embodiment.

Referring to FIG. 1, a communication system 10 according to an embodiment may include a base station 100, a wireless communication terminal 200, and a repeater 300.

The repeater 300 may relay communication between the base station 100 and the wireless communication terminal 200.

According to an embodiment, the repeater 300 may relay a communication signal in a communication network composed of a 4G mobile communication network such as long-term evolution (LTE) or LTE-Advanced, a 5G mobile communication network such as 5G new radio (NR), or a combination thereof.

The repeater 300 may receive a communication signal (e.g., a base station signal) received from the base station 100 through a first antenna ANT1 and may relay the received communication signal (e.g., the base station signal) to the wireless communication terminal 200 through a second antenna ANT2.

According to an embodiment, the communication signal may be a wireless communication signal (e.g., a radio frequency (RF) signal). According to an embodiment, the communication signal may be a communication signal according to a 5G NR standard.

The first antenna ANT1 may be referred to as a donor antenna and the second antenna ANT2 may be referred to as a service antenna or a coverage antenna, but are not limited thereto. According to an embodiment, the first antenna ANT1 may be implemented as a directional antenna, and the repeater 300 may include a configuration for adjusting the direction of the first antenna ANT1.

According to an embodiment, the repeater 300 may be implemented as a repeater for relaying wireless communication signals such as an RF repeater or an interference cancellation system (ICS) repeater.

In FIG. 1, for convenience of description, the repeater 300 relays communication between one base station 100 and one wireless communication terminal 200, but may also relay communication between a plurality of base stations and a plurality of wireless communication terminals. According to another embodiment, the repeater 300 may relay communication between the base station 100 and another repeater (not shown).

Referring to the embodiment of FIG. 2, the repeater 300 may include an RF amplification circuit 310, an intermediate frequency unit 320, an output amplifier 330, and a digital signal processor 340.

The RF amplification circuit 310 may amplify a signal received from a base station through the first antenna ANT1. For example, the RF amplification circuit 310 may include a low-noise amplifier and a filter, but is not limited thereto.

The intermediate frequency unit 320 may switch a frequency of a signal to an intermediate frequency band and provide the switched signal to the output amplifier 330 and the digital signal processor 340. For example, the intermediate frequency unit 320 may include an amplifier, a filter, and a divider, but is not limited thereto. The output amplifier 330 may include an attenuator, a high-power amplifier, and a filter, and may output an amplified signal through the second antenna ANT2 (service antenna).

The digital signal processor 340 may convert an analog signal received at an intermediate frequency into a digital signal, process the digital signal, and store data according to a result of the processing. According to an embodiment, a processor (not shown) included in the digital signal processor 340 may perform an operation such as cross-correlation on the signal or data, and may monitor and control all operations of the repeater 300. That is, a signal-to-interference-plus-noise ratio (SINR) measurement operation of the repeater 300 to be described later below may be performed by the digital signal processor 340.

Figure 3:
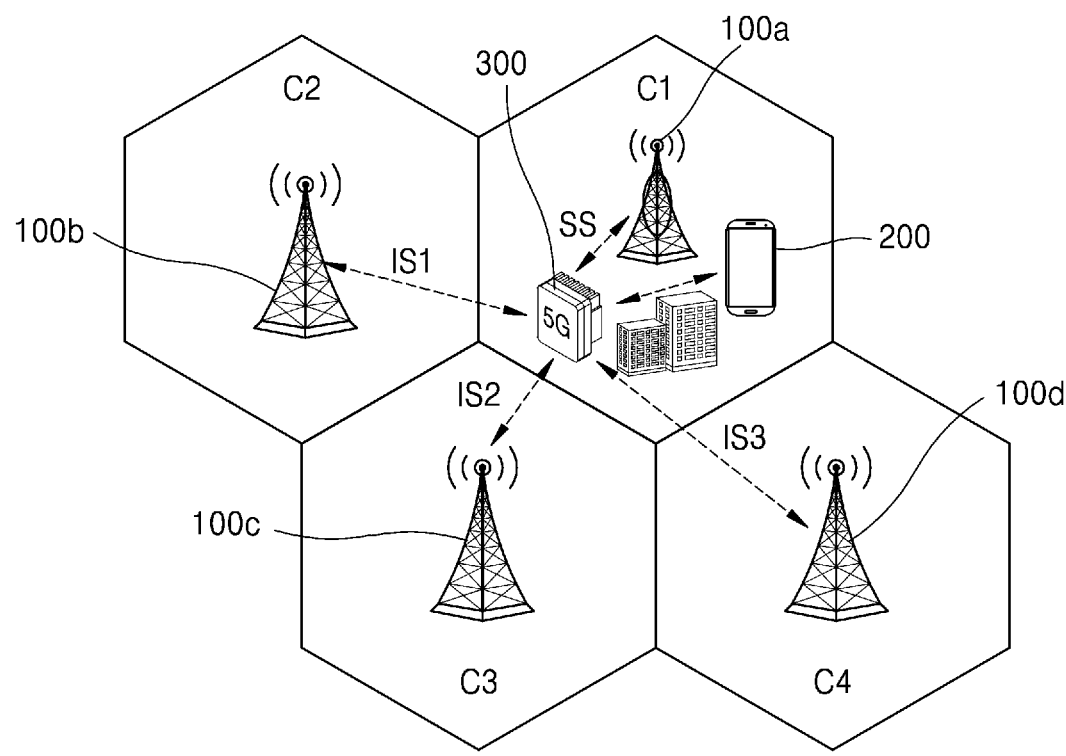
FIG. 3 is an exemplary view illustrating a state in which a repeater is arranged in an environment for receiving a plurality of base station signals.
Figure 4:
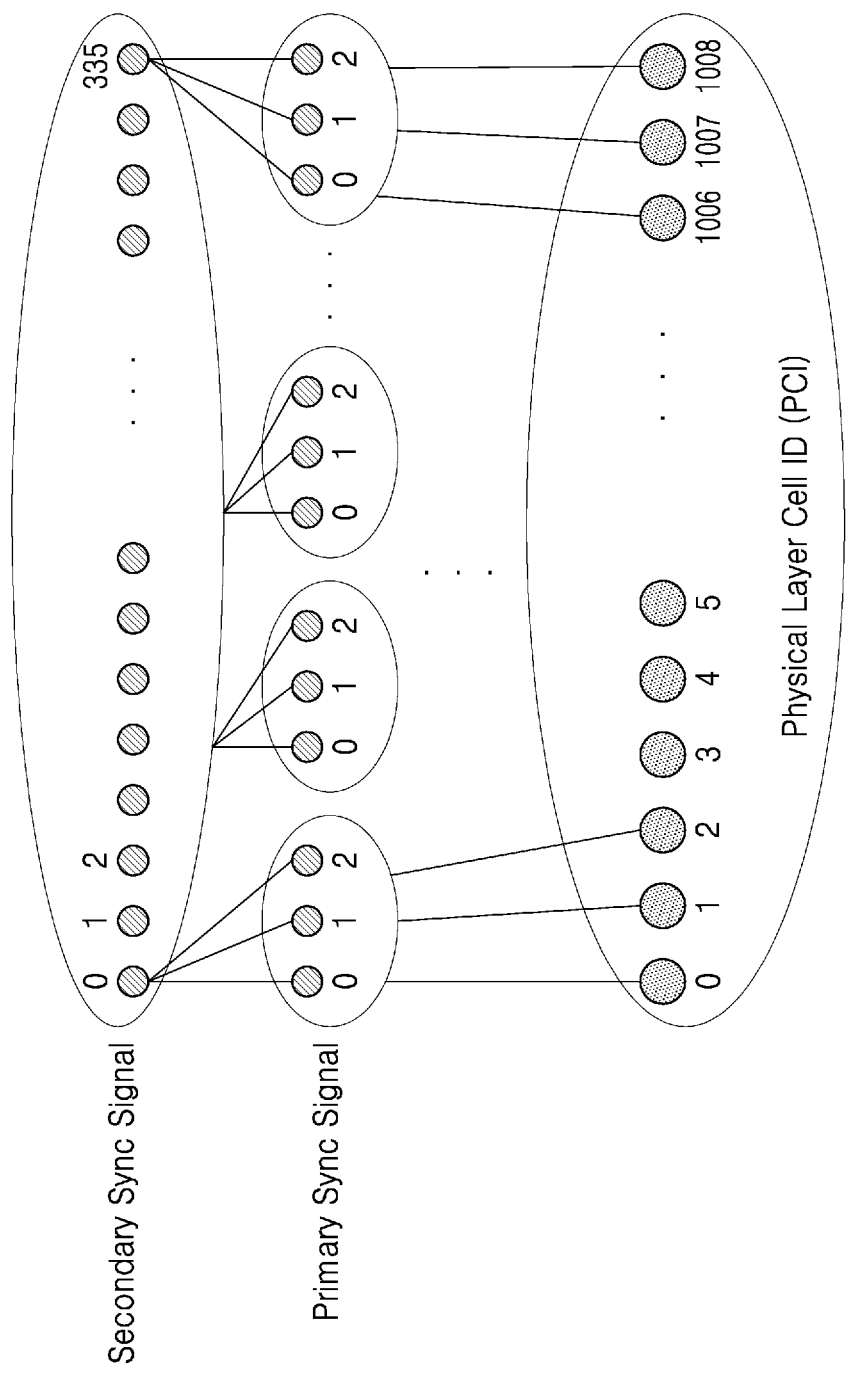
FIGS. 4 to 5 are exemplary views of the form of a synchronization signal ID allocated to each of base station cells.
Figure 5:
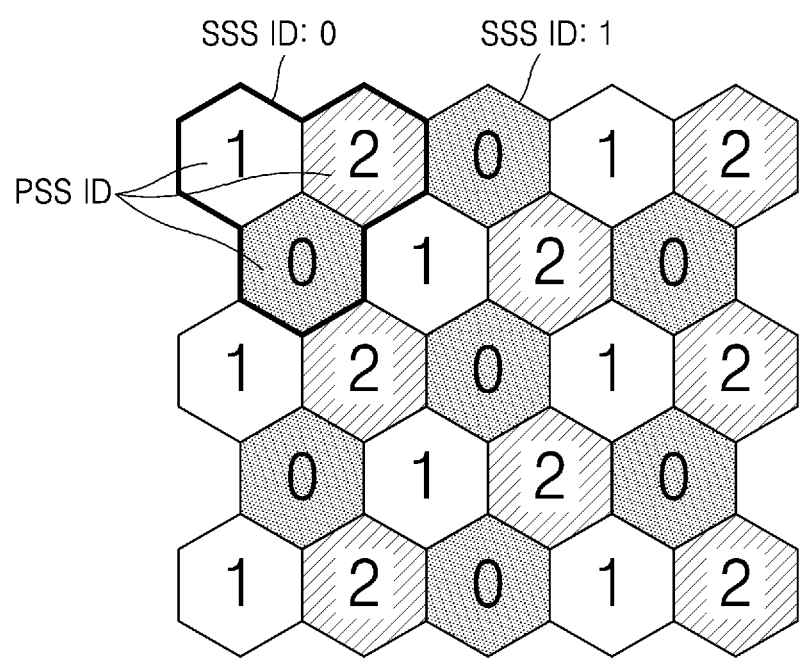
Figure 6:
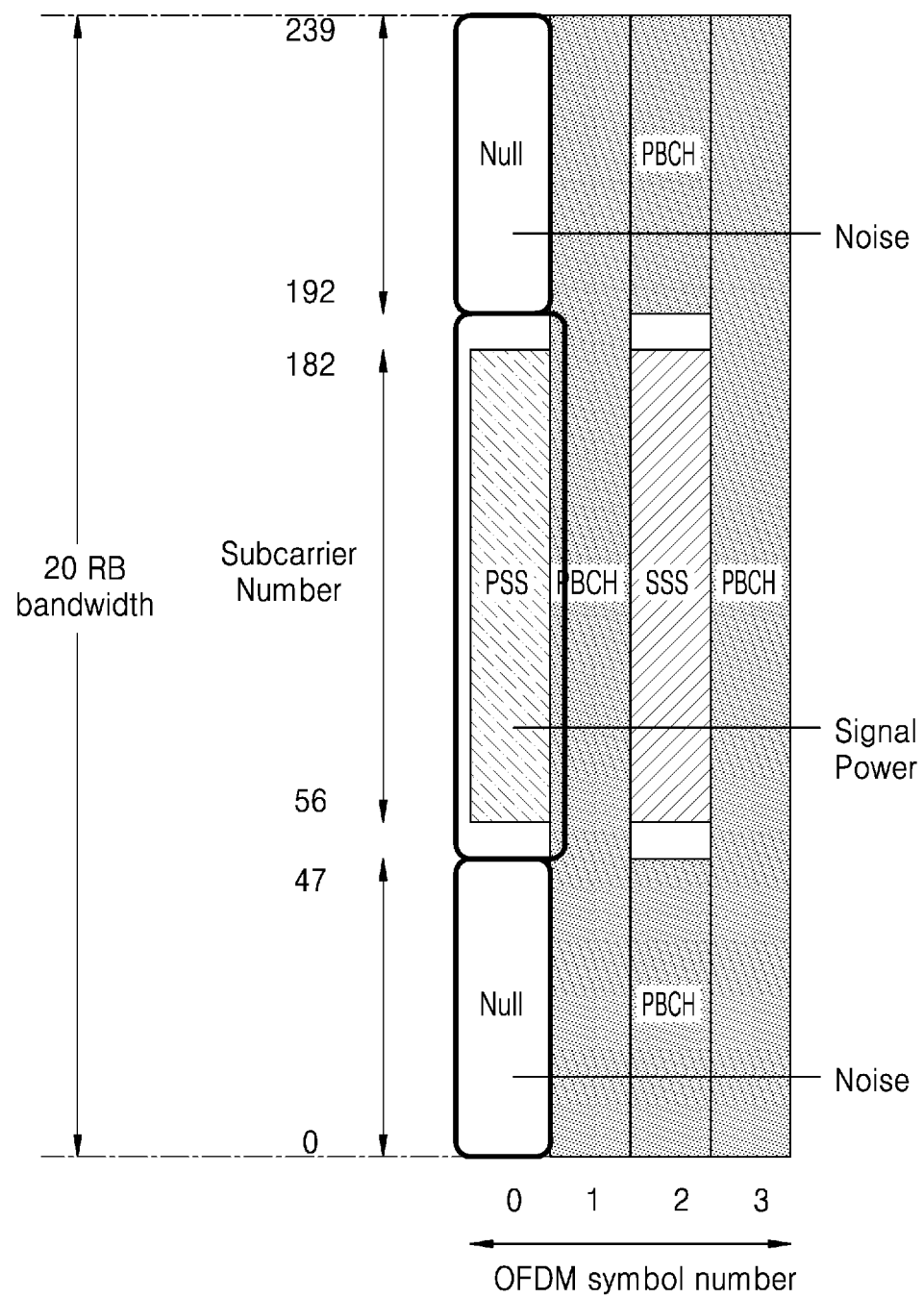
FIG. 6 is a view for explaining areas to be measured for calculation of a signal-to-interference-plus-noise ratio (SINR) from among synchronization signal blocks provided from a base station in the communication system of FIG. 1.

FIG. 3 is an exemplary view illustrating a state in which a repeater is arranged in an environment for receiving a plurality of base station signals. FIGS. 4 to 5 are exemplary views of the form of a synchronization signal ID allocated to each of base station cells. FIG. 6 is a view for explaining areas to be measured for calculation of an SINR from among synchronization signal blocks provided from a base station in the communication system of FIG. 1.

Referring to FIG. 3, a plurality of base stations 100a to 100d may be apart from each other to provide a mobile communication service for each area (cell). The plurality of base stations 100a to 100d may correspond to base stations of the same operator, but are not limited thereto.

The repeater 300 may be installed in a shadow area such as inside a building existing in a first cell C1 to receive a service signal SS (e.g., a synchronization signal, etc.) for connection with the first base station 100a. On the other hand, the repeater 300 according to an embodiment is implemented to receive a signal in a wireless form from a base station through the first antenna ANT1, rather than receiving a signal through a wired connection with a base station. Accordingly, even if the repeater 300 is located in the first cell C1, wireless signals output from the base stations 100b to 100d of adjacent cells C2, C3, and C4 may be received together. In this case, the signals received from the base stations 100b to 100d of the adjacent cells C2, C3, and C4 may act as interference signals IS1, IS2, and IS3 for the service signal SS received from the first base station 100a, and the interference signals IS1, IS2, and IS3 may be factors to degrade mobile communication service quality of the repeater 300.

On the other hand, the repeater 300 may distinguish from which base station each of the signals SS, IS1, IS2, and IS3 is output based on identification information (IDs) included in the signals SS, IS1, IS2, and IS3 received from the base stations 100a to 100d, and may classify the service signal SS and the interference signals IS1, IS2, and IS3 based on a result of the classifying. A mobile communication service provider may allocate different IDs to the base stations 100a to 100d to identify each of the plurality of base stations (or cells).

Referring to FIGS. 4 to 5, an ID for identification of a base station (or cell) (e.g., a physical layer cell ID (PCI)) may be composed of a combination of a primary synchronization signal (PSS) and a secondary synchronization signal (SSS). For example, for 5G NR, the PCI may be composed of a combination of 3 PSSs and 336 SSSs. In order to obtain a PCI of a base station, the repeater 300 may go through a process of first obtaining an ID from a PSS symbol from among received synchronization signal blocks and then obtaining an ID for an SSS. Accordingly, in order to reduce cell interference, the PSS has values of '0', '1', and '2' (PSS IDs) according to a Mod 3 rule, and as shown in FIG. 5, may be allocated so that adjacent cells do not have the same PSS ID, thereby preventing interference. Interference signal power by an adjacent cell may be measured by distinguishing the PSS IDs according to the Mod 3 rule and measuring each size. On the other hand, the SSS may be allocated in units of groups of adjacent cells having different PSS IDs. Although FIG. 5 shows an example in which the SSS ID is allocated in a triangular shape in units of groups of adjacent cells, the allocation type of the SSS ID is not limited thereto.

Referring to the exemplary view of FIG. 3 together, the repeater 300 may be arranged in an area corresponding to the cell C1, which is one of the plurality of cells C1, C2, C3, and C4, and may service a mobile communication signal by performing connection and/or synchronization with the base station 100a providing a service for the corresponding cell C1. For connection and/or synchronization of the repeater 300 and the base station 100a, the base station 100a may periodically (e.g., 20 ms) output the signal SS including a synchronization signal block SSB. The repeater 300 may receive the output signal SS and perform connection and/or synchronization with the base station 100a based on information about the synchronization signal block SSB included in the received signal SS. In addition, as described above, the repeater 300 may receive the signals IS1 to IS3 including respective synchronization signal blocks SSBs of the base stations 100b to 100d of the adjacent cells C2, C3, and C4, and may classify the signals IS1 to IS3 as interference signals based on information about the SSBs included in the received signals IS1 to IS3.

Referring to FIG. 6, the synchronization signal block SSB may include a PSS symbol, an SSS symbol, and a physical broadcast channel (PBCH) symbol. The PSS symbol may include information about the aforementioned PSS IDs, and the SSS symbol may include information about the aforementioned SSS IDs. The PBCH symbol may include a master information block (MIB) including random access information of a base station.

According to an embodiment, the repeater 300 may be implemented to measure an SINR based on a synchronization signal block received from each of the base stations 100a to 100d.

As previously known, the SINR may be defined according to Equation 1 below.

$$SINR = \frac{P_s}{P_n + P_i} \qquad \text{[Equation 1]}$$

As described above, because PSS IDs between adjacent cells are different from each other, the repeater 300 may know signal power $P_s$ and interference signal power $P_i$ based on the PSS symbol (PSS band) from among the received synchronization signal blocks. In addition, the synchronization signal block may include a null area corresponding to a band other than the PSS band. Because power measured in the null area corresponds to noise of a PSS component, the repeater 300 may measure noise power $P_n$ from the null area. An SINR measurement method of the repeater 300 will be described in more detail with reference to FIGS. 7 to 8 below.

Figure 7:
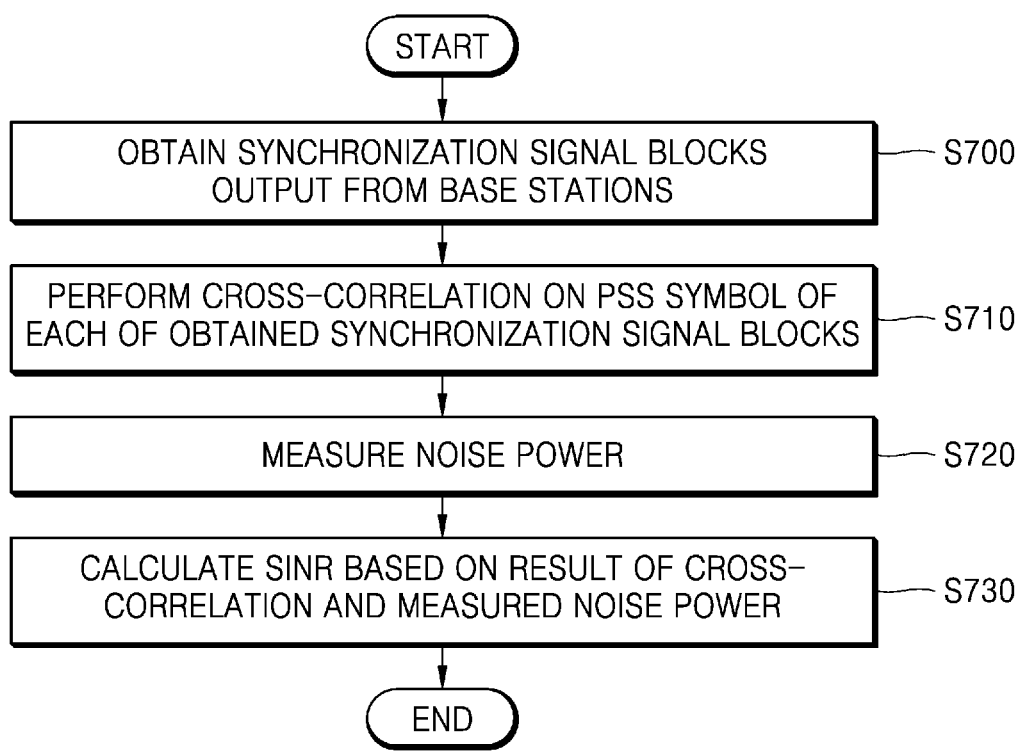
FIG. 7 is a flowchart illustrating an SINR measurement method of a repeater according to an embodiment.
Figure 8:
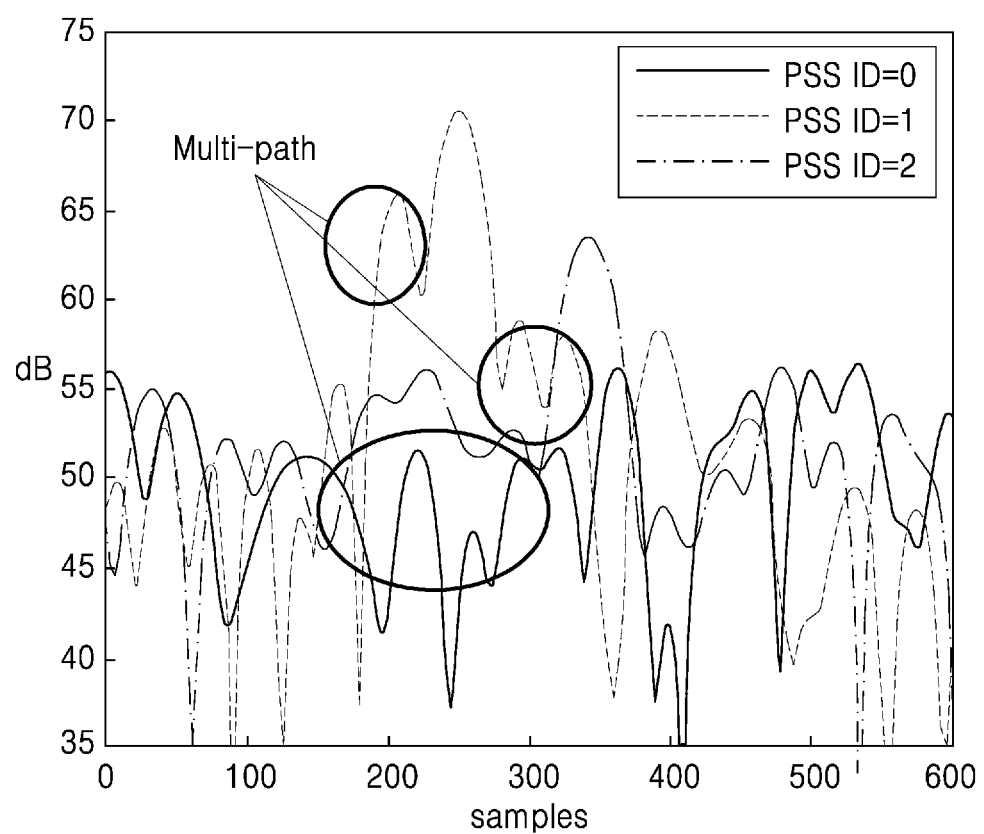
FIG. 8 is an exemplary view of a result of cross-correlation for PSS IDs of synchronization signal blocks received by a repeater.

FIG. 7 is a flowchart illustrating of an SINR measurement method of a repeater according to an embodiment. FIG. 8 is an exemplary view of a result of cross-correlation for PSS IDs of synchronization signal blocks received by a repeater.

Referring to FIG. 7, in operation S700, the repeater 300 may obtain a plurality of synchronization signals (synchronization signal blocks) output from a plurality of base stations 100.

As described above in FIG. 3, the repeater 300 arranged in the first cell C1 to perform wireless communication with the first base station 100a may obtain not only the signal SS provided from the first base station 100a but also the signals (interference signals) IS1, IS2, and IS3 provided from the base stations 100b to 100d of the adjacent cells C2, C3, and C4. For example, each of the received signals is a synchronization signal periodically output from a base station, and may include the synchronization signal block SSB.

In operation S710, the repeater 300 may perform cross-correlation on a PSS symbol of each of the obtained synchronization signals.

According to an embodiment, the repeater 300 may generate a sequence for each PSS ID and obtain cross-correlation between the generated sequence and a PSS symbol. A PSS of 5G NR may include a sequence specified in 3GPP 38.211, and the sequence may be defined according to the equation shown in Table 1 below.

TABLE 1

$d_{pss}(n) = 2 - 2x(m)$
$m = (n + 43N_{ID}^{(2)}) \mod 127$
$0 \leq n < 127$
where
$x(i + 7) = (x(i + 4) + x(i)) \mod 2$
and
$[x(6)\ x(5)\ x(4)\ x(3)\ x(2)\ x(1)\ x(0)] = [1\ 1\ 1\ 0\ 1\ 1\ 0]$ When i is changed to 0, 1, and 2 in the above equation, respectively, a sequence corresponding to each of cases in which the PSS IDs are 0, 1, and 2, respectively, may be obtained.

The repeater 300 may cross-correlate the obtained sequences with PSS symbols of received synchronization signal blocks, respectively. An example of a result of the cross-correlation will be described later with reference to operation S730 and FIG. 8.

In operation S720, the repeater 300 may measure noise power based on an obtained synchronization signal block.

As described above in FIG. 6, the repeater 300 may measure the noise power by measuring signal power of a band corresponding to the null area based on the received synchronization signal blocks.

In operation S730, the repeater 300 may calculate an SINR based on the result of cross-correlation and the measured noise power.

The repeater 300 may obtain information about the signal power $P_s$ and the interference signal power $P_i$ based on a cross-correlation result obtained for each PSS ID.

Referring to FIG. 8 in this regard, the cross-correlation result shown in FIG. 8 shows an example of a result of cross-correlation for PSS IDs of synchronization signal blocks received through the donor antenna ANT1 of the repeater 300 in a multipath fading environment.

In a conventional communication method such as 802.16m (WiMAX), a method of obtaining signal power only with a peak of cross-correlation has been used, but in this case, an error may occur in a multipath fading environment, making it impossible to accurately measure signal power. According to an embodiment, in order to improve an error in a multipath fading environment, a method of obtaining the signal power $P_s$ and the interference signal power $P_i$ based on a dot product of cross-correlation is provided.

First, the repeater 300 may identify an ID of a PSS symbol having the largest cross-correlation as a PSS ID to obtain the signal power $P_s$. In the case of FIG. 8, because the cross-correlation for a PSS symbol having an ID of '1' is the largest, a PSS ID of a base station of a cell in which the repeater 300 is located is identified as '1', and the signal power $P_s$ may be obtained from a cross-correlation result. In addition, the repeater 300 may obtain the interference signal power $P_i$ from a cross-correlation result of PSS symbols having PSS IDs of '0' and '2'.

In addition, in order to set a section for calculating a dot product of cross-correlation, the repeater 300 may set a section including samples in a preset range to the left and right of a sample in which a peak of a PSS ID having the largest cross-correlation is located as the section for calculating a dot product. For example, the set section may correspond to a range that does not include a cyclic prefix (CP) inserted for inter-symbol interference by multipath in an OFDM transmission scheme.

The repeater 300 may calculate a dot product of each PSS ID based on the set section, and may obtain the signal power $P_s$ and the interference signal power $P_i$ from the calculated dot product. According to an embodiment, when frequency synchronization between the repeater 300 and a base station does not match, a frequency error may occur. The base station is synchronized with a global positioning system (GPS), but the repeater 300 is synchronized with an internal clock, so that the frequency error may occur. An SINR measurement error may occur depending on a frequency error. The repeater 300 may reduce the SINR measurement error by minimizing a frequency error by applying a correction coefficient to the calculated dot product. The correction coefficient may be defined by a predefined lookup table or an equation.

The repeater 300 may calculate an SINR by applying the signal power $P_s$ and the interference signal power $P_i$ obtained from a cross-correlation result, and the noise power $P_n$ measured from a null area to Equation 1 above.

In operation S740, the repeater 300 may optimize the direction of the donor antenna (first antenna ANT1) based on the calculated SINR.

According to an embodiment, the repeater 300 may measure an SINR a plurality of times while changing the direction of the donor antenna, and may set the direction of the donor antenna in a direction in which the measured SINR is maximum.

According to an embodiment, when the measured SINR is less than a reference SINR, the repeater 300 may re-measure the SINR by changing the direction of the donor antenna. When the re-measured SINR is greater than the reference SINR, the repeater 300 may set the direction of the donor antenna to a corresponding direction.

That is, an operator may optimize the direction of the donor antenna by measuring the SINR when the repeater 300 is initially installed, and may track and reflect changes in a cell environment by periodically monitoring the SINR through a monitoring device or the like even during the operation of the repeater 300.

According to a signal-to-interference-plus-noise ratio (SINR) measurement method of a repeater according to an embodiment, unlike the prior art, an SINR error in a multipath fading environment may be effectively improved by measuring the magnitudes of signal power and interference signal power using a dot product of a cross-correlation.

In addition, the repeater optimizes a direction of a donor antenna such that a measured SINR is maximized, thereby providing a high-quality mobile communication service to a to shadow area.

While the present disclosure has been particularly shown and described with reference to embodiments thereof, it will be understood that various changes in form and details may be made therein without departing from the spirit and scope of the following claims.

Descriptions of features or aspects within each embodiment should typically be considered as available for other similar features or aspects in other embodiments.

What is claimed is:

1. A signal-to-interference-plus-noise ratio (SINR) measurement method, which is performed by a repeater, the SINR measurement method comprising:
    obtaining synchronization signal blocks (SSBs) from a plurality of base stations;
    obtaining cross-correlation for each of primary synchronization signal (PSS) symbols included in the obtained SSBs;
    measuring noise power based on the obtained SSBs;
    obtaining signal power and interference signal power based on a dot product of the cross-correlation for each of the PSS symbols; and measuring the SINR based on the signal power, the interference signal power, and the noise power.

2. The SINR measurement method of claim 1, wherein the obtaining of the cross-correlation comprises:
generating each sequence of PSS IDs; and
obtaining cross-correlation for each of the PSS symbols by using the generated sequence and the PSS symbols.

3. The SINR measurement method of claim 1, wherein the measuring of noise power comprises:
measuring power of a null area outside a PSS band of the received SSBs as the noise power.

4. The SINR measurement method of claim 1, wherein the respective PSS symbols of the SSBs have different IDs, and
the obtaining of the signal power and the interference signal power comprises:
obtaining the signal power from a dot product of cross-correlation for a first PSS symbol having the largest cross-correlation; and
obtaining the interference signal power from a dot product of cross-correlation for the remaining PSS symbols except for the first PSS symbol.

5. The SINR measurement method of claim 4, wherein the obtaining of the signal power and the interference signal power further comprises:
setting a section including samples in a preset range based on a sample in which a maximum value of the first PSS symbol is located; and
calculating the dot product of the cross-correlation for each of the PSS symbols based on the set section.

6. The SINR measurement method of claim 5, wherein the section is set in a range that does not include a cyclic prefix.

7. The SINR measurement method of claim 4, wherein the obtaining of the signal power and the interference signal power further comprises:
applying a predefined correction coefficient to the dot product of the cross-correlation for each of the PSS blocks.

8. The SINR measurement method of claim 1, further comprising:
optimizing a direction of a donor antenna for communication with a base station based on the measured SINR.

9. A repeater comprising:
a donor antenna configured to receive synchronization signal blocks (SSBs) from a plurality of base stations; and
a digital signal processor configured to:
measure noise power based on the received SSBs,
obtain cross-correlation for each of PSS symbols included in the received SSBs,
obtain signal power and interference signal power based on a dot product of the cross-correlation for each of the PSS symbols, and
measure an SINR based on the signal power, the interference signal power, and the noise power.

10. The repeater of claim 9, wherein the digital signal processor is configured to generate a sequence for each PSS ID, and
obtains cross-correlation for each of the PSS symbols by using the generated sequence and the PSS symbols.

11. The repeater of claim 9, wherein the digital signal processor is configured to measure power of a null area outside a PSS band of the received SSBs as the noise power.

12. The repeater of claim 9, wherein the respective PSS symbols of the SSBs have different IDs, and
the digital signal processor is configured to obtain the signal power from a dot product of cross-correlation for a first PSS symbol having largest cross-correlation, and
obtains the interference signal power from a dot product of cross-correlation for the remaining PSS symbols except for the first PSS symbol.

13. The repeater of claim 12, wherein the digital signal processor is configured to set a section including samples in a preset range based on a sample in which a maximum value of the first PSS symbol is located, and
calculates the dot product of the cross-correlation for each of the PSS symbols based on the set section.

14. The repeater of claim 13, wherein the section is set in a range that does not include a cyclic prefix.

15. The repeater of claim 12, wherein the digital signal processor is configured to apply a predefined correction coefficient to the dot product of the cross-correlation for each of the PSS blocks.

16. The repeater of claim 9, wherein the digital signal processor is configured to optimize a direction of the donor antenna based on the measured SINR.

* * * * *